United States Patent
Yao et al.

(10) Patent No.: US 11,710,054 B2
(45) Date of Patent: Jul. 25, 2023

(54) INFORMATION RECOMMENDATION METHOD, APPARATUS, AND SERVER BASED ON USER DATA IN AN ONLINE FORUM

(71) Applicant: TENCENT TECHNOLOGY (SHENZHEN) COMPANY LIMITED, Shenzhen (CN)

(72) Inventors: Conglei Yao, Shenzhen (CN); Junjie Zhai, Shenzhen (CN); Liang Wang, Shenzhen (CN); Quan Wen, Shenzhen (CN); Yanan Li, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 1120 days.

(21) Appl. No.: 16/289,056

(22) Filed: Feb. 28, 2019

(65) Prior Publication Data
US 2019/0197416 A1   Jun. 27, 2019

Related U.S. Application Data

(63) Continuation of application No. 14/678,890, filed on Apr. 3, 2015, now Pat. No. 10,268,960, which is a (Continued)

(30) Foreign Application Priority Data

Oct. 8, 2012   (CN) .......................... 201210377563.3

(51) Int. Cl.
G06N 5/04 (2023.01)
G06N 5/02 (2023.01)
(Continued)

(52) U.S. Cl.
CPC ................. *G06N 5/04* (2013.01); *G06N 5/02* (2013.01); *G06N 5/022* (2013.01); *G06F 16/9535* (2019.01); *G06N 7/01* (2023.01)

(58) Field of Classification Search
None
See application file for complete search history.

(56) References Cited

U.S. PATENT DOCUMENTS

| 8,954,412 B1 | 2/2015 | Zhao et al. |
| 2007/0143278 A1 | 6/2007 | Srivastava et al. |
| 2012/0023043 A1 | 1/2012 | Cetin et al. |

FOREIGN PATENT DOCUMENTS

| CN | 101923544 A | 12/2010 |
| CN | 101923545 A | 12/2010 |

(Continued)

OTHER PUBLICATIONS

Reda, A. et al. (2012). "Metaphor: A system for related search recommendations". CIKM'12. pp. 664-673. Online Oct. 29, 2012. (Year: 2012).*

(Continued)

*Primary Examiner* — Paulinho E Smith
(74) *Attorney, Agent, or Firm* — Anova Law Group, PLLC

(57) ABSTRACT

The present disclosure discloses a method, apparatus, and server for information recommendation. Search behavior data, browsing behavior data, and click behavior data on recommended content of a specified user in a forum are acquired. A preprocessing on the search behavior data, the browsing behavior data, and the click behavior data on recommended content is performed respectively to obtain a first recommendation result, a second recommendation result, and a third recommendation result. Distribution and integration on the first recommendation result, the second recommendation result, and the third recommendation result (Continued)

are performed according to weights to obtain recommended content to be recommended to the specified user. Search behavior data, browsing behavior data, and click behavior data on recommended content are taken into comprehensive consideration, data used in recommendation is enriched, and accuracy of recommendation is improved.

15 Claims, 4 Drawing Sheets

Related U.S. Application Data continuation of application No. PCT/CN2013/084563, filed on Sep. 29, 2013.

(51) Int. Cl.
*G06N 5/022* (2023.01)
*G06F 16/9535* (2019.01)
*G06N 7/01* (2023.01)

(56) References Cited

FOREIGN PATENT DOCUMENTS

| CN | 101968802 A | | 2/2011 | | |
|---|---|---|---|---|---|
| CN | 102298750 A | | 12/2011 | | |
| CN | 102332006 A | * | 1/2012 | | |
| CN | 102332006 A | | 1/2012 | | |
| CN | 102346899 A | | 2/2012 | | |
| CN | 102479366 A | | 5/2012 | | |
| CN | 102541893 A | | 7/2012 | | |
| CN | 102567902 A | | 7/2012 | | |
| CN | 102708198 A | | 10/2012 | | |
| CN | 103631779 A | * | 3/2014 | ....... | G06F 17/30867 |

OTHER PUBLICATIONS

Agarwal, D. et al. (Feb. 2012). Fast top-k retrieval for model based recommendation. In Proceedings of the fifth ACM international conference on Web search and data mining (pp. 483-492). ACM. doi>10.1145/2124295.2124354.

Liu, Q, et al. (Oct. 2008). Query recommendation with TF-IQF model and popularity factor. In Fuzzy Systems and Knowledge Discovery, 2008. FSKD'08. Fifth International Conference on (vol. 4, pp. 203-207). IEEE. DOI: 10.1109/FSKD.2008.68.

Dupret, G.E. et al. (Jul. 2008). A user browsing model to predict search engine click data from past observations. In Proceedings of the 31st annual international ACM SIGIR conference on Research and development in information retrieval (pp. 331-338). ACM. doi>10.1145/1390334.1390392.

The State Intellectual Property Office of the People's Republic of China (SIPO) Office Action 1 for 201210377563.3 Jul. 26, 2017 pp. 1-7.

The World Intellectual Property Organization (WIPO) International Search Report for PCT/CN2013/084563 Jan. 2, 2014.

* cited by examiner

INFORMATION RECOMMENDATION METHOD, APPARATUS, AND SERVER BASED ON USER DATA IN AN ONLINE FORUM

RELATED APPLICATIONS

This application is a continuation application of U.S. patent application Ser. No. 14/678,890, filed on Apr. 3, 2015. U.S. patent application Ser. No. 14/678,890 is a continuation of PCT Application No. PCT/CN2013/084563, filed on Sep. 29, 2013, which claims priority to Chinese Patent Application No. 201210377563.3, entitled "INFORMATION RECOMMENDATION METHOD AND APPARATUS" filed on Oct. 8, 2012, all of which are incorporated herein by reference in their entirety.

FIELD OF THE DISCLOSURE

The present disclosure relates to the field of the Internet and computer technology, and more particularly, relates to a method, apparatus and server for information recommendation.

BACKGROUND

With the development of social networks, various forum communities appear. A group of users having similar interest may gather in a same forum community and discuss various recent popular topics in various sections of the forum. In a forum, the most fundamental objectives of a user are to read content and acquire information. Therefore, to provide the user with more content or information, when the user is reading content, contents of related subjects may be automatically recommended to the user. It is convenient for the user to acquire relate information, and to improve the stickiness of the website and a click-through rate of a website.

An existing content recommendation method is based on browsing behavior of a user. In the method, it is assumed that users browse the same content have the same interest, browsing behavior of users in a forum is analyzed to establish a two-dimensional matrix for user and browsing-content, a degree of correlation between contents is calculated based on this matrix by using an algorithm such as coordinated filtering, to obtain a recommendation result, and to recommend the recommendation result to a user.

However, existing technologies at least have the following problems. In one forum, a same user may be interested in various aspects, and browsing behavior of the user may cover contents of different subjects. A simple assumption that users that browse the same content have the same interest in existing technologies results in that contents of different subjects are regarded to be close subjects. A recommendation result obtained in this way is not necessarily the content that a user is interested in, which reduces accuracy of recommended content compared with the content that the user is interested in.

In addition, when a forum has a relatively small amount of data, and a user also has a relatively small amount of browsing behavior data, the two-dimensional matrix of user and browsing content may become relatively scarce, which severely affects a final recommendation effect. Therefore, a recommendation result that is purely obtained from browsing behavior of a user is not necessarily accurate for the user, and therefore accuracy of a recommendation result from a forum community to a user is affected.

Therefore, there is a need to solve technical problems in the Internet and computer technology to improve accuracy for recommending contents or information to a user in a forum.

BRIEF SUMMARY OF THE DISCLOSURE

One aspect or embodiment of the present disclosure includes an information recommendation method. Search behavior data, browsing behavior data, and click behavior data on recommended content of a specified user in a forum are acquired. A preprocessing on the search behavior data, the browsing behavior data, and the click behavior data on recommended content is performed respectively to obtain a first recommendation result, a second recommendation result, and a third recommendation result. Distribution and integration on the first recommendation result, the second recommendation result, and the third recommendation result are performed according to weights to obtain recommended content to be recommended to the specified user.

Another aspect or embodiment of the present disclosure includes an information recommendation apparatus. The apparatus includes: an acquisition module, a preprocessing module, and an integration module. The acquisition module is configured to acquire search behavior data, browsing behavior data, and click behavior data on recommended content of a specified user in a forum. The preprocessing module is configured to perform preprocessing on the search behavior data, the browsing behavior data, and the click behavior data on recommended content respectively to obtain a first recommendation result, a second recommendation result, and a third recommendation result. The integration module is configured to perform distribution and integration on the first recommendation result, the second recommendation result, and the third recommendation result according to weights, to obtain recommended content to be recommended to the specified user.

Another aspect or embodiment of the present disclosure includes a server. The server includes one or more processors and a non-transitory computer-readable storage medium having one or more programs stored thereon. The one or more programs are executed by the one or more processors, and include instructions for performing following operations. Search behavior data, browsing behavior data, and click behavior data on recommended content of a specified user in a forum are acquired. A preprocessing on the search behavior data, the browsing behavior data, and the click behavior data on recommended content is performed respectively to obtain a first recommendation result, a second recommendation result, and a third recommendation result. Distribution and integration on the first recommendation result, the second recommendation result, and the third recommendation result are performed according to weights to obtain recommended content to be recommended to the specified user.

Other aspects or embodiments of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure. The embodiments of the present invention are described below with reference to the accompanying drawings. In these accompanying drawings.

DESCRIPTION OF EMBODIMENTS

To make the objectives, technical solutions, and advantages in the present disclosure clearer, the following further describes the implementation manners of the present disclosure in detail with reference to the accompanying drawings.

FIGS. 1-5 illustrate exemplary methods, apparatus, and servers for information recommendation consistent with various disclosed embodiments.

Exemplary Embodiment 1

Figure 1:
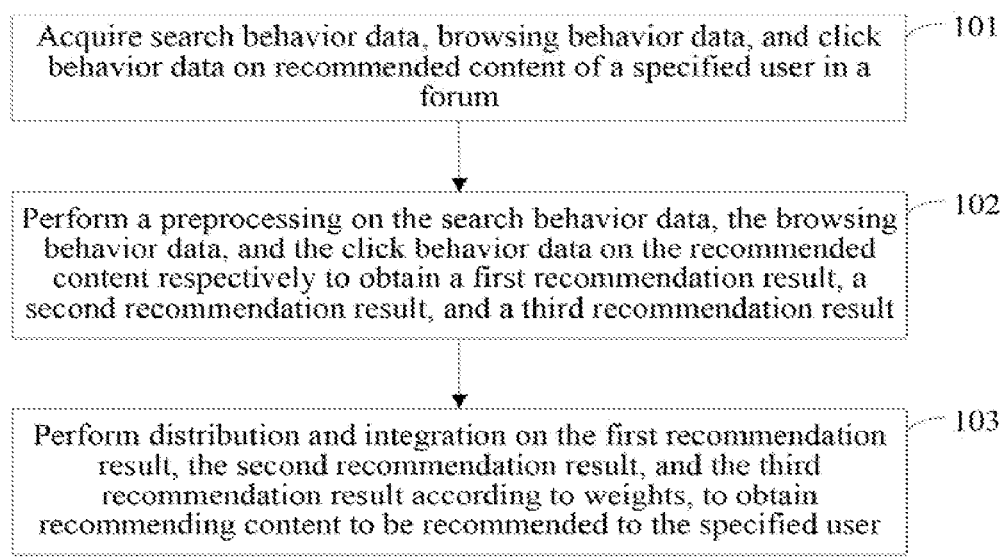
FIG. 1 is a flowchart of an exemplary information recommendation method consistent with various disclosed embodiments.

FIG. 1 illustrates an exemplary information recommendation method consistent with various disclosed embodiments.

In Step 101: search behavior data, browsing behavior data, and click behavior data on recommended content of a specified user in a forum are acquired.

In Step 102: a preprocessing on the search behavior data, the browsing behavior data, and the click behavior data on the recommended content is performed respectively to obtain a first recommendation result, a second recommendation result, and a third recommendation result.

In Step 103: distribution and integration on the first recommendation result, the second recommendation result, and the third recommendation result are performed according to weights, to obtain recommending content to be recommended to the specified user.

To preprocess the search behavior data to obtain the first recommendation result, noise data in the search behavior data are filtered out to obtain noise-cancelled data. The noise-cancelled data can include a query string input in the forum by the specified user. Number of clicks triggered by each query string Qi on a post Ti is counted. According to the number of clicks triggered by each query string Qi on the post Ti, a click probability wi triggered by each query string on the post Ti is calculated. According to the click probability wi triggered by each query string on the post Ti, a query vector for triggering a click on the post Ti is established, where the query vector is <w1, w2, . . . , wi, . . . . , wn>. According to the query vector established for each post, a relevance degree between any two posts is calculated to obtain the first recommendation result.

In one embodiment, to preprocess the browsing behavior data to obtain the second recommendation result, a post browsed by the specified user in the forum is acquired by analyzing the browsing behavior data. According to a section containing the browsed post, browsing behavior of the specified user is categorized into at least one parent subject segment. Text similarities between titles of posts in each parent subject segment are calculated to obtain boundaries between child subject segments in each parent subject segment. According to the boundaries between the child subject segments of a corresponding parent subject segment, the corresponding parent subject segment is categorized to obtain at least one child subject segment. According to each child subject segment, a browsing behavior matrix of the specified user is established. The browsing behavior matrix includes a child subject and a number of appearing times that posts in the forum appear in the child subject. A relevance degree of the browsing behavior matrix is calculated to obtain the second recommendation result.

To preprocess the click behavior data to obtain the third recommendation result, the click behavior data are analyzed to obtain related posts of each post in the forum and to obtain the number of times that each related post is clicked. According to the number of times that each related post is clicked and a relationship between a click time when the related post is clicked and a current time, the related posts in the forum are analyzed, so that a related post, having a most number of clicks and having a difference value between the click time and the current time within a preset range, is sorted in the front of a queue, to obtain the third recommendation result.

Optionally, to perform distribution and integration on the first recommendation result, the second recommendation result, and the third recommendation result according to weights, to obtain recommending content to be recommended to the specified user: a first average probability, a second average probability, and a third average probability that related posts of each post in the forum appear in the first recommendation result, the second recommendation result, and the third recommendation result are calculated respectively. According to the first average probability, the second average probability, and the third average probability, the weight of the first recommendation result, the weight of the second recommendation result, and the weight of the third recommendation result are determined respectively.

Based on the weight of the first recommendation result, the weight of the second recommendation result, and the weight of the third recommendation result, distribution and integration are performed on the first recommendation result, the second recommendation result, and the third recommendation result, to obtain the recommending content to be recommended to the specified user. Alternatively, according to a preset first weight of the first recommendation result, a preset second weight of the second recommendation result, and a preset third weight of the third recommendation result, distribution and integration are performed on the first recommendation result, the second recommendation result, and the third recommendation result, to obtain the recommending content to be recommended to the specified user.

As such, search behavior data, browsing behavior data, and click behavior data on recommended content of a specified user in a forum are acquired. Preprocessing is performed on the search behavior data, the browsing behavior data, and the click behavior data on the recommended content respectively to obtain a first recommendation result, a second recommendation result, and a third recommendation result. Distribution and integration are performed on the first recommendation result, the second recommendation result, and the third recommendation result, to obtain recommending content to be recommended to the specified user. Search behavior data, browsing behavior data, and click behavior data on recommended content are taken into comprehensive consideration, data used in recommendation is enriched, and accuracy of recommendation is improved.

Exemplary Embodiment 2

An embodiment of the present invention provides an information recommendation method. In a forum, fundamental behavior of a user includes: browsing behavior, search behavior, and click behavior on recommended content. In one embodiment, a search behavior model, a browsing behavior model, and a recommendation click behavior model are established. By using these three models, three types of behavior data of the user in the forum are analyzed respectively to obtain three different recommendation results. Finally, the three different recommendation results are integrated or otherwise rearranged to obtain final recommended content.

Figure 2:
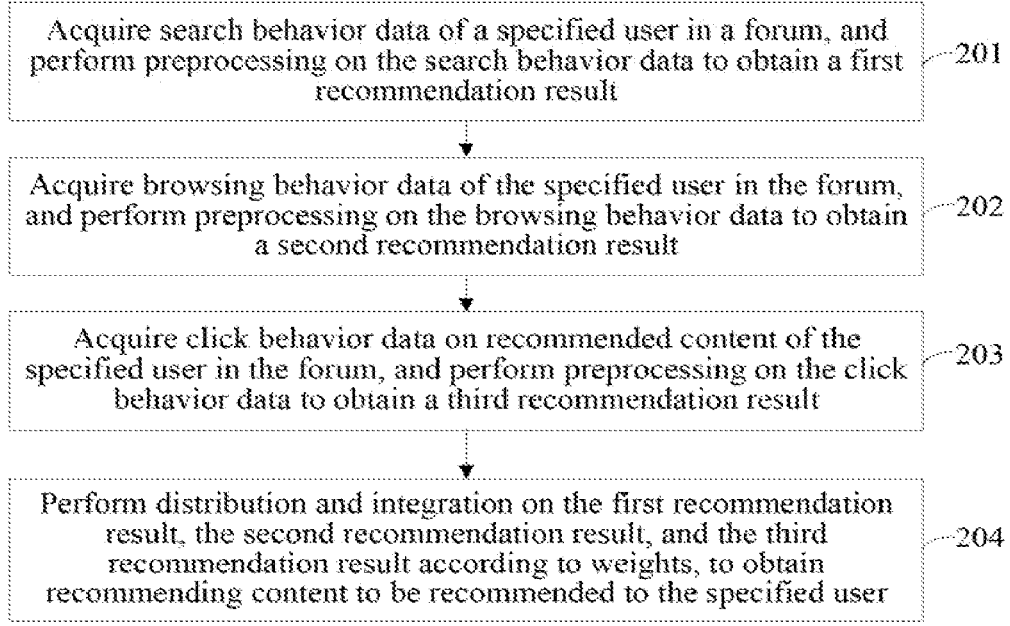
FIG. 2 is a flowchart of another exemplary information recommendation method consistent with various disclosed embodiments.

FIG. 2 illustrates another exemplary information recommendation method consistent with various disclosed embodiments.

In Step 201: search behavior data of a specified user in a forum are acquired. Preprocessing on the search behavior data is performed to obtain a first recommendation result.

For example, the forum may be any forum community on a network or social network, and the specified user may be any user using the forum. Any forum and users can be included and not limited in the present disclosure.

In one embodiment, during modeling of search behavior, data in the forum are analyzed to acquire the search behavior data of the specified user in the forum. The search behavior data includes search click behavior data. Preprocessing is first performed on the search click behavior data to filter out noise data of a malicious click. Next, a mapping from a query string to a clicked post is established. Based on such a mapping relationship, the post is denoted as a query vector to further calculate subject relevance degree of subject of the post to obtain a recommendation result.

The noise data may refer to normal operation behavior data of a non-forum user including, for example, those from robot crawling, malicious clicks, and/or other un-normal data. In various embodiments, the noise data may include any non-related data without limitation. Noise data is distributed in terms of time in certain modes. For example, when first several pages of search results of one query are clicked by a same user within a sufficiently short time, this clicked event may be noise data. By using these modes, noise data may be filtered out to obtain clean, noise-cancelled data.

In this exemplary step, to preprocess the search behavior data to obtain the first recommendation result, noise data in the search behavior data are filtered out to obtain noise-cancelled data. The noise-cancelled data may include all query strings input in the forum by the specified user. The number of clicks triggered by each query string $Q_i$ on a post $T_i$ is counted, where $c(Q_i,T)$ is the number of clicks triggered by a query $Q_i$ on a post $T$. According to the number of clicks triggered by each query string $Q_i$ on the post $T_i$, a click probability $w_i$ triggered by each query string on the post $T_i$ is calculated, where $w_i = c(Q_i,T)/(c(Q_1,T)+c(Q_2,T)+\ldots+c(Q_n,T))$, and n is the total number of query strings. According to the click probability $w_i$ triggered by each query string on the post $T_i$, a query vector for triggering a click on the post $T_i$ is established, where the query vector is $<w_1, w_2, \ldots, w_i, \ldots, w_n>$. According to a query vector established for each post, a relevance degree between any two posts is calculated to obtain the first recommendation result.

In one embodiment, when the specified user performs a search/query by using a same query string, different search results are output. The specified user may click different posts at each time of search. Therefore, each post may be denoted by a query vector for triggering a click on the post according to click data of the post corresponding to a query string. For a post T, a query vector of the post T is: $T=<w_1, w_2, \ldots, w_i, \ldots w_n>$. In this manner, each post may be denoted by the query vector. For two posts $T_i$ and $T_j$ a similarity (or similarity degree) between query vectors corresponding to the two posts $T_i$ and $T_j$ may be used to measure relevance degree of the subject between the two posts $T_i$ and $T_j$. For example, $T_i<w_1, w_2, w_3, \ldots, w_n>$, and $T_j<v_1, v_2, v_3, \ldots, v_n>$, and a cosine distance, that is, a cosine of an included angle between the two vectors, is usually used in the calculation of relevance. Then the similarity (or similarity degree) is $Sim<T_i,T_j>=(T_i*T_j)/(|T_i||T_j|)$.

In one embodiment, during the calculation of a similarity between query vectors, a classic vector space model may be used to perform calculation. Certainly, other suitable methods for calculating a vector similarity may also be used, and are not limited in present disclosure.

In Step 202: browsing behavior data of the specified user in the forum are acquired. Preprocessing on the browsing behavior data is performed to obtain a second recommendation result.

For example, during modeling of browsing behavior of a user, characteristics of browsing behavior of the specified user in the forum need to be analyzed first. And according to the characteristics, preprocessing is performed on the browsing behavior of the user, so that data after processing may genuinely reflect a relationship between interest of the user and content of posts. In a specific implementation process, on the one hand, content in the forum is often organized by sections, and content of posts in each section usually focuses on one big subject (e.g., a parent subject). Under this big subject, some small subjects (e.g., child subjects) are expanded and discussed in different posts. For example, a big subject can be "cultural consumption", and therefore, many small subjects may exist under the subject "cultural consumption", and different users may make further discussions according to small subjects that the users are interested in. On the other hand, a user often browses the forum in a fashion of section-by-section. When the users browse posts in a same section, because of the continuity of the interest of the users, even though the browsed posts are about different small subjects, the distribution of the subjects of the posts is still continuous.

Based on the characteristics of browsing behavior of a user in a forum, for browsing behavior of a user within a continuous period of time, preprocessing of the browsing behavior data to obtain a second recommendation result includes: a post browsed by the specified user in the forum is acquired by analyzing the browsing behavior data. According to a section containing the browsed post, browsing behavior of the specified user is categorized into at least one parent subject segment. Text similarities between titles of posts in each parent subject segment are calculated to obtain boundaries between child subject segments in each parent subject segment. The corresponding parent subject segment is categorized according to the boundaries between the child subject segments, to obtain at least one child subject segment. According to each child subject segment, a browsing behavior matrix of the specified user is established. The browsing behavior matrix includes: a child subject and the number of appearing times that posts in the forum appear in the child subject. Calculation of relevance degree is performed on the browsing behavior matrix to obtain the second recommendation result.

In this exemplary step, according to a section containing a browsed post, browsing behavior is categorized into a big parent subject segment. Text similarities between titles of posts in each parent subject segment are calculated to find boundaries between basic subject segments (or child subject segments), to further categorize each parent subject segment into multiple child subject segments. In this manner, posts in each child subject segment may all under a same subject, and the posts may reflect clear and single interest of a user. Next, for recent browsing behavior of all users in each forum, a two-dimensional matrix can be established. One dimension in the two-dimensional matrix is a child subject segment of each user. If browsing behavior of one user $U_i$ includes $N_i$ basic subject segments, the size of the dimension corresponding to a number M of users is $N_1+N_2+ \ldots + N_i+ \ldots +N_M$. The other dimension in the two-dimensional matrix is a dimension of posts, where the value of a matrix element represents the number of appearing times that a post appears in one child subject segment.

For example, Table 1 illustrates an exemplary two-dimensional matrix involving four subjects and three users.

TABLE 1

|        | Subject 1 | Subject 2 | Subject 3 | Subject 4 |
|--------|-----------|-----------|-----------|-----------|
| User 1 | 1         | 1         | 0         | 0         |
| User 2 | 0         | 1         | 1         | 0         |
| User 3 | 1         | 0         | 0         | 1         |

In Table 1, a matrix element may be 1, denoting that a user has browsed a corresponding subject, another matrix element may be 0, denoting that a user has not browsed a corresponding subject. Vector description of subject 1 is then in the column <1, 0, 1> corresponding to subject 1, and vector description of subject 2 is in the column <1, 1, 0> corresponding to subject 2.

In one embodiment, the established two-dimensional matrix is used as an input to calculate the relevance degree between posts using an item-to-item method in a classic collaborative filtering algorithm, to obtain the second recommendation result. In one embodiment, any known coordinated filtering algorithm may be used herein.

In Step 203: click behavior data on the recommended content of the specified user in the forum are acquired. The click behavior data are preprocessed to obtain a third recommendation result.

When recommending related posts, for a certain post, a system (e.g., a computing system) may recommend several related posts to a user. In one embodiment, click information of the specified user clicking on these recommended posts are obtained, and modeling of a recommendation click behavior is performed according to the click information of the related posts. If each post is considered as a query and related posts of the post are considered as query results, the click behavior data on recommended content may be equivalent to click data in query results with sorted (or ranked) relevance. In one embodiment, a classic algorithm in a click model is used to rearrange/re-sort related posts to achieve a more desirable effect.

To preprocess the click behavior data to obtain the third recommendation result, the click behavior data are analyzed to obtain related posts of each post in the forum and the number of times that each related post is clicked. According to the number of times that each related post is clicked and a relationship between the time when the related post is clicked and a current time, the related posts in the forum are rearranged or re-sorted, so that a related post, having a most number of clicks and having a difference value between the click time and the current time within a preset range, is arranged/sorted in the front of a queue, to obtain the third recommendation result.

In one embodiment, on the one hand, the rearrangement or re-sorting may be performed according to the number of times that related posts are clicked. On the other hand, in consideration of a strong timeliness characteristic of data in a forum, click data for recommendations at different time need to be processed differently, so that a post of which a difference value between the click time and the current time within a preset range is arranged or sorted in the front of the queue.

As disclosed herein, a queue refers to a queue of recommendation results. After the recommendation results are obtained, the recommendation results are placed in the queue to wait for recommendation. The preset range may be about 5 minutes, about 10 minutes, about 20 minutes, about 30 minutes, or any suitable period of time.

It should be noted that, Steps 201 to 203 may not be implemented in any specific order. In one embodiment, these steps may be implemented in parallel or may be implemented in an order of time. Any suitable implementation processes may be used in the present disclosure.

In Step 204: distribution and integration are performed on the first recommendation result, the second recommendation result, and the third recommendation result according to weights, to obtain recommending content to be recommended to the specified user.

After establishing the modeling on the above described three exemplary user behavior data, each modeling module outputs a corresponding recommendation result, and distribution and integration need to be performed on the three recommendation results. An exemplary integration method may include a voting mechanism. Specifically, based on the voting mechanism, distribution and integration may be performed on the first recommendation result, the second recommendation result, and the third recommendation result according to weights, to obtain recommending content to be recommended to the specified user. For example, a first average probability, a second average probability, and a third average probability that related posts of each post in the forum appear in the first recommendation result, the second recommendation result, and the third recommendation result may be calculated respectively.

According to the first average probability, the second average probability, and the third average probability, the weight of the first recommendation result, the weight of the second recommendation result, and the weight of the third recommendation result may be determined respectively. Based on the weight of the first recommendation result, the weight of the second recommendation result, and the weight of the third recommendation result, distribution and integration are performed on the first recommendation result, the second recommendation result, and the third recommendation result, to obtain the recommending content to be recommended to the specified user.

Certainly, the integration method is not limited to the voting mechanism. In another embodiment, according to influence degree of different user behavior generated on recommendation results, different weights may be pre-determined and provided to the recommendation results. For example, a recommendation result outputted from a model of recommendation click behavior has the highest weight, a recommendation result outputted from a model of browsing behavior has a secondary weight (between the highest weight and the lowest weight), and a recommendation result outputted from a model of search behavior has the lowest weight. Next, a final recommending content is obtained in combination with the integration of the three recommendation results having different weights.

Therefore, in an exemplary embodiment, to perform distribution and integration on the first recommendation result, the second recommendation result, and the third recommendation result according to weights, to obtain recommending content to be recommended to the specified user, distribution and integration are performed, according to a preset first weight of the first recommendation result, a preset second weight of the second recommendation result, and a preset third weight of the third recommendation result, on the first recommendation result, the second recommendation result, and the third recommendation result, to obtain the recommending content to be recommended to the specified user.

In one embodiment, when integrating these results, suitable time is selected to update data in an online recommendation system, to achieve a desirable recommendation effect. Because accumulation of user behavior data takes time, and calculation based on models of the exemplary three user behavior takes time, active periods (cycles) of users in each forum are analyzed to find an inactive time period of users on each form. During such inactive time period of users, modeling calculation and result update can be performed. For example, an analysis performed on a forum may find that less users' behavior occurs in a time period between 1:00 am to 9:00 am, which can then be selected to perform calculation and update.

As such, search behavior data, browsing behavior data, and click behavior data on recommended content of a specified user in a forum are acquired. Preprocessing is performed on the search behavior data, the browsing behavior data, and the click behavior data on recommended content respectively to obtain a first recommendation result, a second recommendation result, and a third recommendation result. Distribution and integration are performed on the first recommendation result, the second recommendation result, and the third recommendation result according to weights, to obtain recommending content to be recommended to the specified user. Search behavior data, browsing behavior data, and click behavior data on recommended content are taken into comprehensive consideration, data used in recommendation is enriched, and accuracy of recommendation is improved.

Exemplary Embodiment 3

Figure 3:
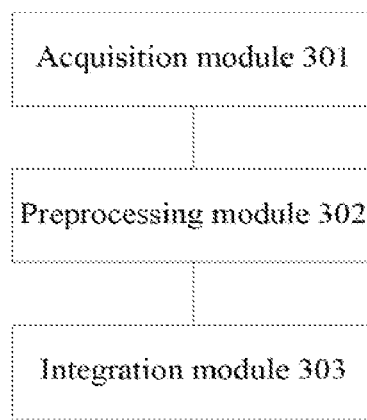
FIG. 3 is a schematic structural diagram of an exemplary information recommendation apparatus consistent with various disclosed embodiments.

FIG. 3 illustrates an exemplary information recommendation apparatus. The exemplary apparatus may include: an acquisition module 301, a preprocessing module 302, and an integration module 303.

The acquisition module 301 is configured to acquire search behavior data, browsing behavior data, and click behavior data on recommended content of a specified user in a forum.

The preprocessing module 302 is configured to perform preprocessing on the search behavior data, the browsing behavior data, and the click behavior data on recommended content respectively to obtain a first recommendation result, a second recommendation result, and a third recommendation result.

The integration module 303 is configured to perform distribution and integration on the first recommendation result, the second recommendation result, and the third recommendation result according to weights, to obtain recommending content to be recommended to the specified user.

Figure 4:
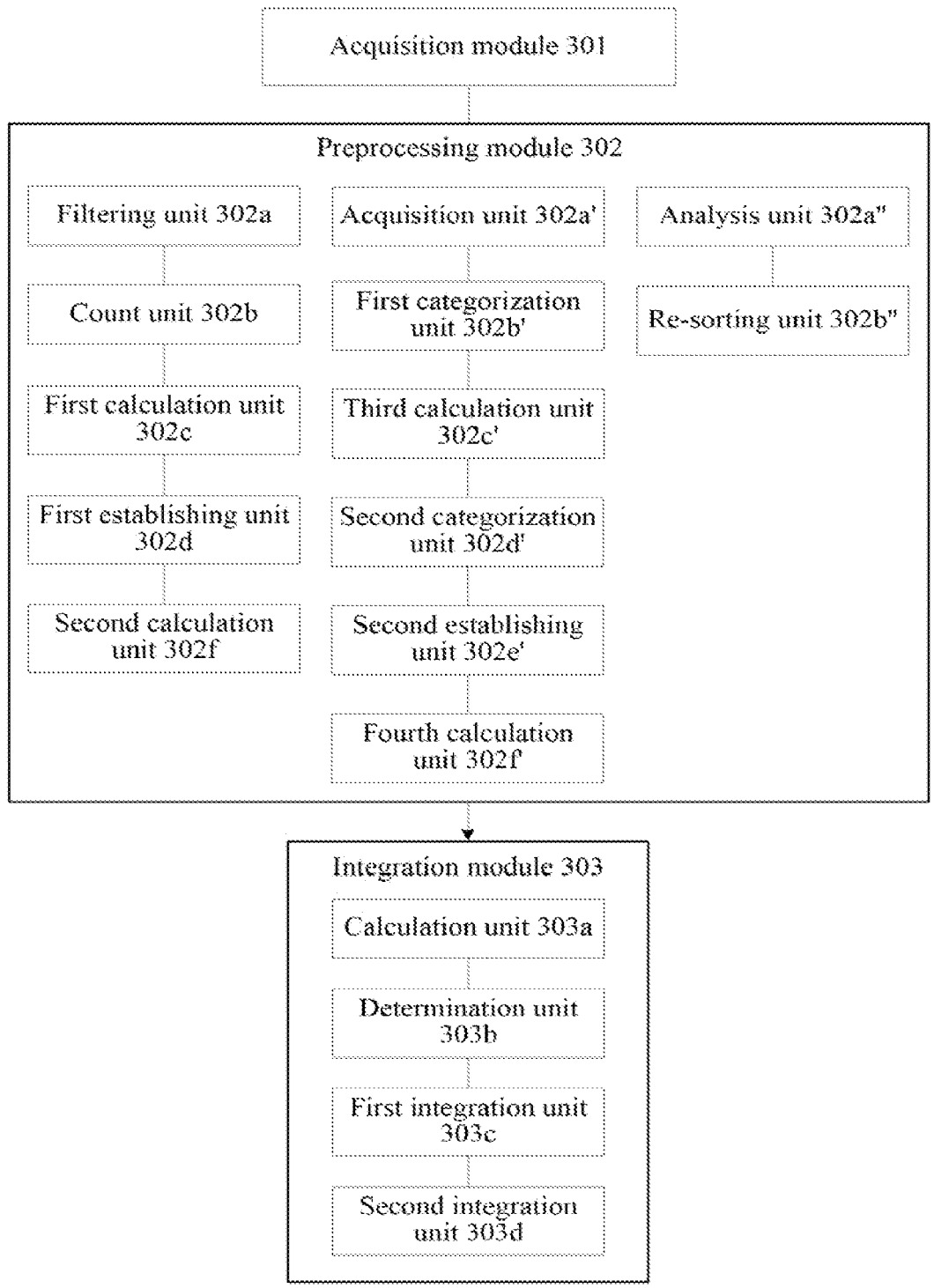
FIG. 4 is a schematic structural diagram of another exemplary information recommendation apparatus consistent with various disclosed embodiments.

Referring to FIG. 4, the preprocessing module 302 includes: a filtering unit 302a, a count unit 302b, a first calculation unit 302c, a first establishing unit 302d, and a second calculation unit 302f.

The filtering unit 302a is configured to filter out noise data in the search behavior data to obtain noise-cancelled data. The noise-cancelled data includes a query string input in the forum by the specified user. The count unit 302b is configured to count the number of clicks triggered by each query string Qi on a post Ti. The first calculation unit 302c is configured to calculate, according to the number of clicks triggered by each query string Qi on the post Ti, a click probability wi triggered by each query string on the post Ti.

The first establishing unit 302d is configured to establish, according to the click probability wi triggered by each query string on the post Ti, a query vector for triggering a click on the post Ti, where the query vector is <w1, w2, . . . , wi, . . . , wn>. The second calculation unit 302f is configured to calculate, according to a query vector established for each post, a relevance degree between any two posts, to obtain the first recommendation result.

Referring to FIG. 4, the preprocessing module 302 includes: an acquisition unit 302a', a first categorization unit 302b', a third calculation unit 302c', a second categorization unit 302d', a second establishing unit 302e', and a fourth calculation unit 302f'.

The acquisition unit 302a' is configured to acquire a post browsed by the specified user in the forum by analyzing the browsing behavior data. The first categorization unit 302b' is configured to categorize, according to a section containing the browsed post, browsing behavior of the specified user into at least one parent subject segment. The third calculation unit 302c' is configured to calculate text similarities between titles of posts in each parent subject segment, to obtain boundaries between child subject segments in each parent subject segment.

The second categorization unit 302d' is configured to categorize a corresponding parent subject segment according to the boundaries between the child subject segments, to obtain at least one child subject segment. The second establishing unit 302e' is configured to establish, according to each child subject segment, a browsing behavior matrix of the specified user. The browsing behavior matrix includes: a child subject and the number of appearing times that posts in the forum appear in the child subject. The fourth calculation unit 302f' is configured to perform relevance degree calculation on the browsing behavior matrix, to obtain the second recommendation result.

Referring to FIG. 4, the preprocessing module 302 includes: an analysis unit 302a'' and a re-sorting unit 302b''.

The analysis unit 302a'' is configured to analyze the click behavior data, to obtain related posts of each post in the forum and the number of times that each related post is clicked. The re-sorting unit 302b'' is configured to re-sort, according to the number of times that each related post is clicked and a relationship between a click time when the related post is clicked and a current time, the related posts in the forum, so that a related post, having a most number of clicks and having a difference value between the click time and the current time within a preset range, is sorted in the front of a queue, to obtain the third recommendation result.

Optionally, referring to FIG. 4, the integration module 303 includes: a calculation unit 303a, a determination unit 303b, a first integration unit 303c, and a second integration unit 303d.

The calculation unit 303a is configured to calculate respectively a first average probability, a second average probability, and a third average probability that related posts of each post in the forum appear in the first recommendation result, the second recommendation result, and the third recommendation result. The determination unit 303b is configured to determine respectively, according to the first average probability, the second average probability, and the third average probability, the weight of the first recommendation result, the weight of the second recommendation result, and the weight of the third recommendation result.

The first integration unit 303c is configured to perform, based on the weight of the first recommendation result, the weight of the second recommendation result, and the weight of the third recommendation result, distribution and integration on the first recommendation result, the second recommendation result, and the third recommendation result, to obtain the recommending content to be recommended to the specified user.

Alternatively, the second integration unit 303d is configured to perform, according to a preset first weight of the first recommendation result, a preset second weight of the second recommendation result, and a preset third weight of the third recommendation result, distribution and integration on the first recommendation result, the second recommendation result, and the third recommendation result, to obtain the recommending content to be recommended to the specified user.

As such, search behavior data, browsing behavior data, and click behavior data on recommended content of a specified user in a forum are acquired. Preprocessing is performed on the search behavior data, the browsing behavior data, and the click behavior data on recommended content respectively to obtain a first recommendation result, a second recommendation result, and a third recommendation result. Distribution and integration are performed on the first recommendation result, the second recommendation result, and the third recommendation result according to weights, to obtain recommending content to be recommended to the specified user. Search behavior data, browsing behavior data, and click behavior data on recommended content are taken into comprehensive consideration, data used in recommendation is enriched, and accuracy of recommendation is improved.

In various embodiments, the disclosed modules can be configured in one apparatus (e.g., a processing unit) or configured in multiple apparatus as desired. The modules disclosed herein can be integrated in one module or in multiple modules. Each of the modules disclosed herein can be divided into one or more sub-modules, which can be recombined in any manner. In addition, the modules can be directly or indirectly coupled or otherwise communicated with each other, e.g., by suitable interfaces.

In the present disclosure each embodiment is progressively described, i.e., each embodiment is described and focused on difference between embodiments. Similar and/or the same portions between various embodiments can be referred to with each other. In addition, exemplary apparatus and/or systems are described with respect to corresponding methods.

The disclosed methods, apparatus, and/or systems can be implemented in a suitable computing environment. The disclosure can be described with reference to symbol(s) and step(s) performed by one or more computers, unless otherwise specified. Therefore, steps and/or implementations described herein can be described for one or more times and executed by computer(s).

Figure 5:
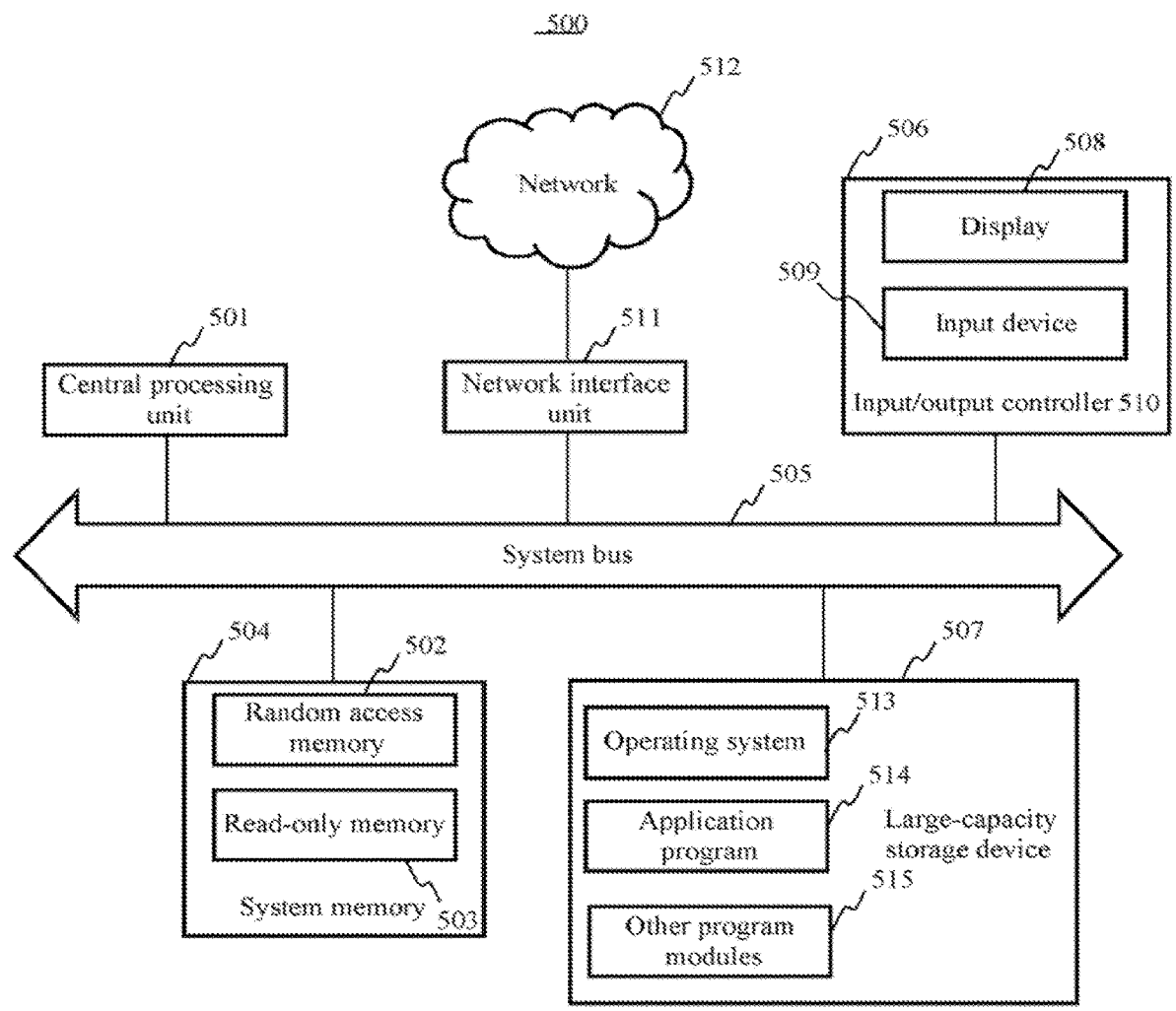
FIG. 5 is a schematic structural diagram of an exemplary server consistent with various disclosed embodiments.

FIG. 5 is a schematic structural diagram of an exemplary server consistent with various disclosed embodiments.

The server 500 includes a central processing unit (CPU) 501, a system memory 504 including a random access memory (RAM) 502 and a read-only memory (ROM) 503, and a system bus 505 connecting the system memory 504 and the central processing unit 501. The server 500 further includes a basic input/output (I/O) system 506 that assists information transmission between various components in a computer, and a large-capacity storage device 507 configured to store an operating system 513, an application program 514, and another program module 515.

The basic I/O system 506 includes a display 508 configured to display information and an input device 509, for example, a mouse, a keyboard, configured to input information by a user. The display 508 and the input device 509 are both connected to an I/O controller 510 of the system bus 505 to be connected to the central processing unit 501. The basic I/O system 506 may further include the I/O controller 510 configured to receive and process inputs from multiple other devices such as a keyboard, a mouse, or an electronic stylus. Similarly, the I/O controller 510 further provides an output to a display screen, a printer or another type of output device.

The large-capacity storage device 507 is connected to a large-capacity storage controller (not shown) of the system bus 505 to be connected to the central processing unit 501. The large-capacity storage device 507 and a computer readable medium correlated to the large-capacity storage device 507 provide the client device 500 with nonvolatile storage. That is, the large-capacity storage device 507 may include a computer readable storage medium (not shown) such as a hard disk or a CD-ROM drive.

Generally, the computer readable storage medium may include a computer storage medium and a communications medium. The computer storage medium includes volatile and nonvolatile, and removable and non-removable medium implemented in any method or technology for storage of information such as a computer readable instruction, a data structure, a program module or other data. The computer storage medium includes, but is not limited to, a RAM, a ROM, an EEPROM, a flash memory or another memory technology, a CD-ROM, a digital versatile disk (DVD) or another optical storage apparatus, a magnetic cassette, magnetic tape, a magnetic disk storage apparatus or other magnetic storage device. Certainly, a person skilled in the art may learn that the computer storage medium is not limited to the several types above. The foregoing system memory 504 and the large-capacity storage device 507 may be generally referred to as a memory.

According to various embodiments of the present invention, the server 500 may further be executed by a remote computer that is connected to a network through a network such as the Internet. That is, the server 500 may be connected to a network interface unit 511 on the system bus 505 to be connected to a network 512, or may also be connected to another type of network or remote computer system (not shown) by using the network interface unit 511.

The memory further includes one or more programs, and the one or more programs are stored in the memory, and are configured to be executed by one or more central processing units 501. The one or more programs include instructions configured to execute the information recommendation method, e.g., as shown in FIGS. 1-2.

In this manner, to improve accuracy of recommended content in a forum, the present disclosure provides a method, apparatus, and server for information recommendation. For example, search behavior data, browsing behavior data, and click behavior data on recommended content of a specified user in a forum are acquired. Preprocessing is performed on the search behavior data, the browsing behavior data, and the click behavior data on recommended content respectively to obtain a first recommendation result, a second recommendation result, and a third recommendation result. Distribution and integration are performed on the first recommendation result, the second recommendation result, and the third recommendation result according to weights, to obtain recommended content to be recommended to the specified user. Search behavior data, browsing behavior data, and click behavior data on recommended content are taken into comprehensive consideration, data used in recommendation is enriched, and accuracy of recommendation is improved.

It should be understood that steps described in various methods of the present disclosure may be carried out in order as shown, or alternately, in a different order. Therefore, the order of the steps illustrated should not be construed as limiting the scope of the present disclosure. In addition, certain steps may be performed simultaneously.

One of ordinary skill in the art would appreciate that suitable software and/or hardware may be included and used in the disclosed methods, apparatus, and/or systems. For example, the disclosed embodiments can be implemented by hardware only, which alternatively can be implemented by software products only. The software products can be stored in computer-readable storage medium including, e.g., ROM/RAM, magnetic disk, optical disk, etc. The software products can include suitable commands to enable a terminal device (e.g., including a mobile phone, a personal computer, a server, or a network device, etc.) to implement the disclosed embodiments.

The embodiments disclosed herein are exemplary only. Other applications, advantages, alternations, modifications, or equivalents to the disclosed embodiments are obvious to those skilled in the art and are intended to be encompassed within the scope of the present disclosure.

What is claimed is:

1. An information recommendation method, comprising:
acquiring, by a server coupled to an online forum, search behavior data, browsing behavior data, and click behavior data on recommended content of a specified user in the online forum, the server containing at least a memory and a processor;
processing the search behavior data, the browsing behavior data, and the click behavior data on the recommended content, respectively, to obtain a first recommendation result based on the search behavior data, a second recommendation result based on the browsing behavior data, and a third recommendation result based on the click behavior data, wherein processing the search behavior data comprises:
detecting a number of pages clicked on a query within a time range;
determining the number of pages clicked within the time range as noise data;
filtering out the noise data from the search behavior data to obtain noise-cancelled data, the noise-cancelled data including click numbers of a plurality of query strings on a post $T_1$ and a post $T_2$, the posts $T_1$ and $T_2$ representing any two posts in the online forum; and
processing the noise-cancelled data to obtain the first recommendation result, comprising:
counting a number of clicks respectively triggered by each of the query strings $Q_i$ on the post $T_1$ and a number of clicks respectively triggered by each of the query strings $Q_i$ on the post $T_2$;
calculating a click probability $w_{i1}$ triggered by each of the query strings $Q_i$ on the post $T_1$ by respectively dividing the number of clicks triggered by each of the query strings $Q_i$ on the post $T_1$ by a total number of clicks triggered by all the query strings on the post $T_1$, to establish a query vector $V_1$ corresponding to the post $T_1$, each element of the query vector $V_1$ being the click probability $w_{i1}$ triggered by one of the query strings $Q_i$ on the post $T_1$;
calculating a click probability $w_{i2}$ triggered by each of the query strings $Q_i$ on the post $T_2$ by respectively dividing the number of clicks triggered by each of the query strings $Q_i$ on the post $T_2$ by a total number of clicks triggered by all the query strings on the post $T_2$, to establish a query vector $V_2$ corresponding to the post $T_2$, each element of the query vector $V_2$ being the click probability $w_{i2}$ triggered by one of the query strings $Q_i$ on the post $T_2$; and
calculating a relevance degree between the post i1 and the post i2 by measuring a distance between the query vector $V_1$ and the query vector $V_2$, to obtain the first recommendation result, the distance being a cosine distance of the query vectors $V_1$ and $V_2$ that represents a cosine of an included angle between the two query vectors $V_1$ and $V_2$;
integrating the first recommendation result, the second recommendation result, and the third recommendation result according to weights to obtain the recommending content to be recommended to the specified user corresponding to a current post; and
when detecting that the specified user is browsing the current post of the online forum, presenting the recommending content to the specified user, the recommending content being targeted to the specified user individually.

2. The method according to claim 1, wherein processing the browsing behavior data comprises:
acquiring a post browsed by the specified user in the forum by analyzing the browsing behavior data;
categorizing, according to the browsed post, browsing behavior of the specified user into a parent subject segment; and
calculating text similarities between titles of posts in the parent subject segment.

3. The method according to claim 1, wherein processing the click behavior data comprises:
analyzing the click behavior data to obtain related posts of each post in the forum and to obtain a number of times that each related post is clicked; and
sorting the related posts in the forum according to the number of times that each related post is clicked and a relationship between a click time when the related post is clicked and a current time to obtain the third recommendation result.

4. The method according to claim 1, wherein the weights include a first weight of the first recommendation result, a second weight of the second recommendation result, and a third weight of the third recommendation result, and wherein integrating the first recommendation result, the second recommendation result, and the third recommendation result comprises:

calculating, respectively, a first average probability, a second average probability, and a third average probability that related posts of each post in the online forum appear in the first recommendation result, the second recommendation result, and the third recommendation result; and obtaining the recommending content to be recommended to the specified user, according to the first average probability as the first weight, the second average probability as the second weight, and the third average probability as the third weight.

5. The method according to claim 1, further comprising:
updating the acquiring of the search behavior data, the browsing behavior data, and the click behavior data during a selected time period of a day.

6. A server coupled to an online forum, comprising: one or more processors; and a storage medium coupled to the one or more processor; wherein the one or more processors are configured to perform:

acquiring search behavior data, browsing behavior data, and click behavior data on recommended content of a specified user in the online forum;

processing the search behavior data, the browsing behavior data, and the click behavior data on the recommended content, respectively, to obtain a first recommendation result based on the search behavior data, a second recommendation result based on the browsing behavior data, and a third recommendation result based on the click behavior data, wherein processing the search behavior data comprises:

detecting a number of pages clicked on a query within a time range;

determining the number of pages clicked within the time range as noise data;

filtering out the noise data from the search behavior data to obtain noise-cancelled data, the noise-cancelled data including click numbers of a plurality of query strings on a post $T_1$ and a post $T_2$, the posts $T_1$ and $T_2$ representing any two posts in the online forum; and processing the noise-cancelled data to obtain the first recommendation result, comprising:

counting a number of clicks respectively triggered by each of the query strings $Q_i$ on the post $T_1$ and a number of clicks respectively triggered by each of the query strings $Q_i$ on the post $T_2$;

calculating a click probability $w_{i1}$ triggered by each of the query strings $Q_i$ on the post $T_1$ by respectively dividing the number of clicks triggered by each of the query strings $Q_i$ on the post $T_1$ by a total number of clicks triggered by all the query strings on the post $T_1$, to establish a query vector $V_1$ corresponding to the post $T_1$, each element of the query vector Vi being the click probability $w_{i1}$ triggered by one of the query strings $Q_i$ on the post $T_1$;

calculating a click probability wiz triggered by each of the query strings $Q_i$ on the post $T_2$ by respectively dividing the number of clicks triggered by each of the query strings $Q_i$ on the post $T_2$ by a total number of clicks triggered by all the query strings on the post $T_2$, to establish a query vector $V_2$ corresponding to the post $T_2$, each element of the query vector $V_2$ being the click probability wiz triggered by one of the query strings $Q_i$ on the post $T_2$; and calculating a relevance degree between the post i1 and the post i2 by measuring a distance between the query vector $V_1$ and the query vector $V_2$, to obtain the first recommendation result, the distance being a cosine distance of the query vectors $V_1$ and $V_2$ that represents a cosine of an included angle between the two query vectors $V_1$ and $V_2$;

integrating the first recommendation result, the second recommendation result, and the third recommendation result according to weights to obtain the recommending content to be recommended to the specified user corresponding to a current post; and when detecting that the specified user is browsing the current post of the online forum, presenting the recommending content to the specified user, the recommending content being targeted to the specified user individually.

7. The server according to claim 6, wherein processing the browsing behavior data comprises:

acquiring a post browsed by the specified user in the forum by analyzing the browsing behavior data;

categorizing, according to the browsed post, browsing behavior of the specified user into a parent subject segment; and calculating text similarities between titles of posts in the parent subject segment.

8. The server according to claim 6, wherein processing the click behavior data comprises:

analyzing the click behavior data to obtain related posts of each post in the forum and to obtain a number of times that each related post is clicked; and sorting the related posts in the forum according to the number of times that each related post is clicked and a relationship between a click time when the related post is clicked and a current time to obtain the third recommendation result.

9. The server according to claim 6, wherein the weights include a first weight of the first recommendation result, a second weight of the second recommendation result, and a third weight of the third recommendation result, and wherein integrating the first recommendation result, the second recommendation result, and the third recommendation result comprises:

calculating, respectively, a first average probability, a second average probability, and a third average probability that related posts of each post in the online forum appear in the first recommendation result, the second recommendation result, and the third recommendation result; and obtaining the recommending content to be recommended to the specified user, according to the first average probability as the first weight, the second average probability as the second weight, and the third average probability as the third weight.

10. The server according to claim 6, wherein the one or more processors are further configured to:

update the acquiring of the search behavior data, the browsing behavior data, and the click behavior data during a selected time period of a day.

11. A non-transitory computer-readable storage medium storing computer program instructions executable by at least one processor of a server to perform:

acquiring search behavior data, browsing behavior data, and click behavior data on recommended content of a specified user in an online forum coupled to the server;

processing the search behavior data, the browsing behavior data, and the click behavior data on the recommended content, respectively, to obtain a first recommendation result based on the search behavior data, a second recommendation result based on the browsing behavior data, and a third recommendation result based on the click behavior data, wherein processing the search behavior data comprises:

detecting a number of pages clicked on a query within a time range;

determining the number of pages clicked within the time range as noise data;

filtering out the noise data from the search behavior data to obtain noise-cancelled data, the noise-cancelled data including click numbers of a plurality of query strings on a post $T_1$ and a post $T_2$, the posts $T_1$ and $T_2$ representing any two posts in the online forum; and processing the noise-cancelled data to obtain the first recommendation result, comprising:

counting a number of clicks respectively triggered by each of the query strings $Q_i$ on the post $T_1$ and a number of clicks respectively triggered by each of the query strings $Q_i$ on the post $T_2$;

calculating a click probability $w_{i1}$ triggered by each of the query strings $Q_i$ on the post $T_1$ by respectively dividing the number of clicks triggered by each of the query strings $Q_i$ on the post $T_1$ by a total number of clicks triggered by all the query strings on the post $T_1$, to establish a query vector $V_1$ corresponding to the post $T_1$, each element of the query vector $V_1$ being the click probability $w_{i1}$ triggered by one of the query strings $Q_i$ on the post $T_1$;

calculating a click probability wiz triggered by each of the query strings $Q_i$ on the post $T_2$ by respectively dividing the number of clicks triggered by each of the query strings $Q_i$ on the post $T_2$ by a total number of clicks triggered by all the query strings on the post $T_2$, to establish a query vector $V_2$ corresponding to the post $T_2$, each element of the query vector $V_2$ being the click probability wiz triggered by one of the query strings $Q_i$ on the post $T_2$; and calculating a relevance degree between the post i1 and the post i2 by measuring a distance between the query vector $V_1$ and the query vector $V_2$, to obtain the first recommendation result, the distance being a cosine distance of the query vectors $V_1$ and $V_2$ that represents a cosine of an included angle between the two query vectors $V_1$ and $V_2$;

integrating the first recommendation result, the second recommendation result, and the third recommendation result according to weights to obtain the recommending content to be recommended to the specified user corresponding to a current post; and when detecting that the specified user is browsing the current post of the online forum, presenting the recommending content to the specified user, the recommending content being targeted to the specified user individually.

12. The storage medium according to claim 11, wherein processing the browsing behavior data comprises:

acquiring a post browsed by the specified user in the forum by analyzing the browsing behavior data;

categorizing, according to the browsed post, browsing behavior of the specified user into a parent subject segment; and calculating text similarities between titles of posts in the parent subject segment.

13. The storage medium according to claim 11, wherein processing the click behavior data comprises:

analyzing the click behavior data to obtain related posts of each post in the forum and to obtain a number of times that each related post is clicked; and sorting the related posts in the forum according to the number of times that each related post is clicked and a relationship between a click time when the related post is clicked and a current time to obtain the third recommendation result.

14. The storage medium according to claim 11, wherein the weights include a first weight of the first recommendation result, a second weight of the second recommendation result, and a third weight of the third recommendation result, and wherein integrating the first recommendation result, the second recommendation result, and the third recommendation result comprises:

calculating, respectively, a first average probability, a second average probability, and a third average probability that related posts of each post in the online forum appear in the first recommendation result, the second recommendation result, and the third recommendation result; and obtaining the recommending content to be recommended to the specified user, according to the first average probability as the first weight, the second average probability as the second weight, and the third average probability as the third weight.

15. The non-transitory computer-readable storage medium according to claim 11, wherein the computer program instructions are executable by the at least one processor to further perform:

updating the acquiring of the search behavior data, the browsing behavior data, and the click behavior data during a selected time period of a day.

* * * * *